(No Model.)
W. H. HART, Jr.
BICYCLE JACK.
No. 506,495.
Patented Oct. 10, 1893.
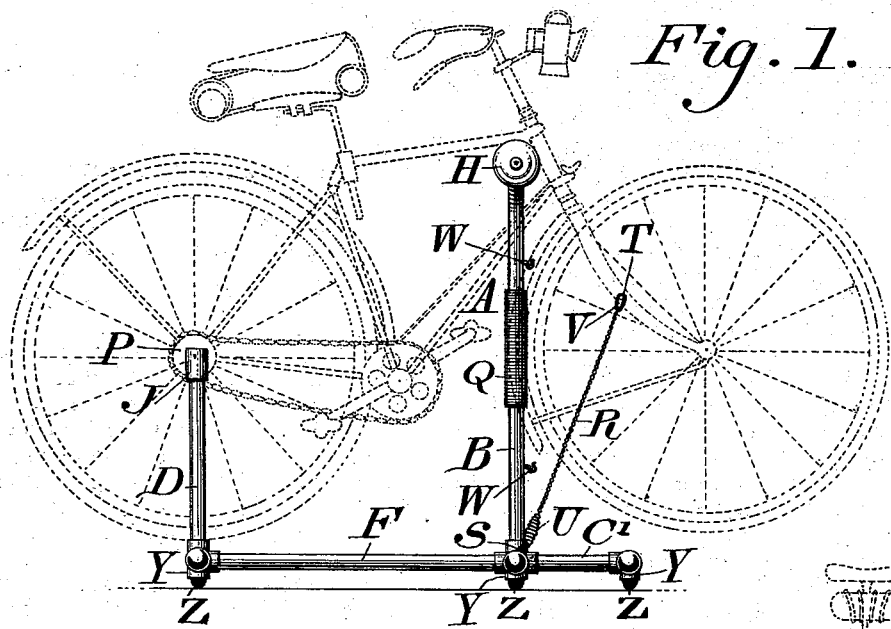
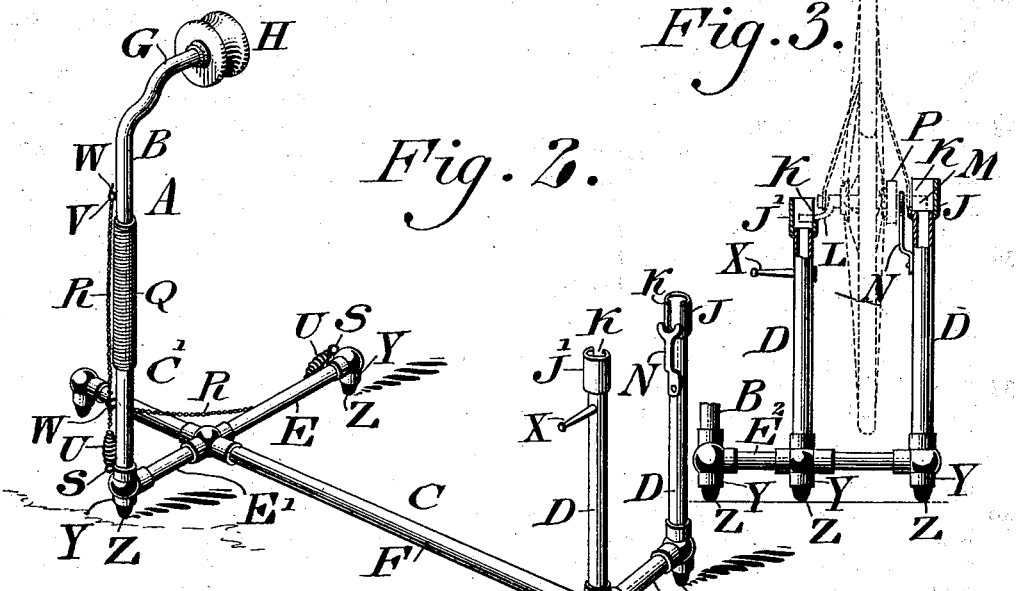
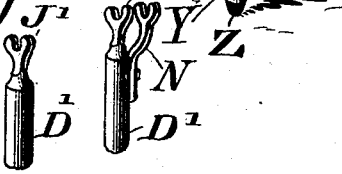
WITNESSES:
O. F. Eagle.
L. Douville.
INVENTOR
Wm. H. Hart, Jr.
BY
[signature]
ATTORNEY.

UNITED STATES PATENT OFFICE.

WILLIAM H. HART, JR., OF PHILADELPHIA, PENNSYLVANIA.

BICYCLE-JACK.

SPECIFICATION forming part of Letters Patent No. 506,495, dated October 10, 1893.

Application filed October 6, 1892. Serial No. 447,934. (No model.)

*To all whom it may concern:*

Be it known that I, WILLIAM H. HART, Jr., a citizen of the United States, residing in the city and county of Philadelphia, State of Pennsylvania, have invented a new and useful Improvement in Bicycle-Jacks, which improvement is fully set forth in the following specification and accompanying drawings.

My invention consists of a jack for supporting a bicycle or holding the same in elevated position, the various features of the same being hereinafter set forth.

It also consists of means for keeping the steering wheel to the front, as will be hereinafter set forth.

Figure 1 represents a side elevation of a bicycle jack embodying my invention. Fig. 2 represents a perspective view thereof. Fig. 3 represents a rear view partly sectional and partly broken away. Fig. 4 represents a modification of a portion thereof.

Similar letters of reference indicate corresponding parts in the several figures.

Referring to the drawings:—A designates a frame or stand formed of the front standard B, the base C, and rear standards D, said base consisting of the front and rear cross pieces E, and the longitudinally extending piece F, which is secured to said cross pieces E, it being noticed that the several standards rise from the base C. On the side of the base, opposite to the cross pieces E, are extensions E′, E², which may be said to form continuities of said pieces, whereby the base is made broad, and thus prevents overturning or tilting of the frame A, especially as the standard B rises from the extension E′ of the base, owing to the space required at the front of the frame aside of said standard.

The upper end of the standard B is deflected laterally, as at G, and on the same is mounted the grooved roller H, which may be formed of soft rubber or other suitable material, or of a hard substance faced with said material, for preventing abrasion of the portion of the bicycle which may come in contact with said roller.

In the upper ends of the rear standards D are sockets J, J′, the inner side of each of which is recessed as at K, to form a seat for the step L and nut M, at the outer ends of the axle of the rear wheel of the bicycle, or in lieu thereof, the ends of said axle, said step and nut being shown in dotted lines in Fig. 3. Rising from one of the standards and secured thereto adjacent to the socket J, is a bifurcated arm N, which is adapted to embrace the axle of the bicycle between the nut M and the pinion P thereof, thus acting as a keeper, by which provision springing apart of the standards D is prevented.

On the standard B, is a sleeve Q of soft rubber or other elastic or flexible material, which serves to prevent abrasion or scratching of the part of the bicycle that is liable to come in contact with said standard, as the bicycle is being applied to or removed from the frame.

The operation is as follows:—The bicycle is raised, and the reach or back-bone thereof placed on the roller H, and the bicycle as supported and guided on said roller, is moved until the parts on the ends of the rear axle are above the sockets J, after which the bicycle is lowered at its rear end, so that said parts enter the recesses K, it being seen that the bicycle is controlled at both ends on the frame A, and held elevated so that its wheels clear the floor or ground, by which provision the bicycle is prevented from falling over or overturning, it may be mounted and operated for the purpose of teaching others to ride thereupon, or for practice, exercise, testing, &c., the wheels may be conveniently cleaned and lubricated, the saddle, treadles and other parts adjusted, and other advantages are presented due to the elevated support of the bicycle. The bicycle may be raised clear of the roller and sockets in which it is seated, and thus again placed on the floor or ground, and run as usual.

When the bicycle is supported on the frame, the front wheel is liable to turn, and thus occupy an objectionable position. To prevent this, I employ chains or cords R, one end of each of which is connected with eyes S on the base C, and the other end is adapted to be attached to the foot rests as at T, on the front wheel, thus keeping the wheel to the front. In order to prevent strain to or avoid blows on the parts with which said chains are connected, due to any motion that the front wheel may receive in its tendency to turn, there are secured to said chains in the length thereof, the coiled springs U, which render the former somewhat elastic in their nature, the effect of which is evident. The ends of the chains have rubber rings V connected with them, for preventing scratching of the foot rests of the bicycle on which they are hung, and the standard B is provided with hooks W, to sustain the chains when not in use, as will be seen in Fig 2.

Projecting from one of the rear standards D is a perch X, on which the foot is placed when it is desired to mount the bicycle or dismount therefrom when supported on the stand.

The under side of the base C, is provided with sockets Y, in which are fitted the cushions Z of rubber or other suitable elastic or flexible material, the friction of which with the floor or ground serves to prevent shifting of the stand, especially when the bicycle as supported is occupied and operated for learning, exercise, &c.

In order to prevent the frame from tilting forward, especially when the bicycle is occupied, the base C, has at its front end, an extension C', which lengthens said frame, especially in front of the roller H, and prevents the front cross bars E, E', acting as an axis or fulcrum on which the frame may turn.

In Fig. 4, I show forks J' in lieu of the sockets J, at the side of one of which is a bifurcated arm N', which is similar to the bifurcated arm N in the other figures, for supporting the axle of the wheel, and preventing springing apart of the standards D', which support said forks and arm.

Having thus described my invention, what I claim as new, and desire to secure by Letters Patent, is—

1. In a bicycle jack, a base consisting of a longitudinally-extending piece, cross pieces extending on opposite sides of said longitudinally-extending piece, standards secured to one of said cross pieces and having recessed portions at their upper ends, and a standard secured to a second cross piece and having a laterally deflected upper end with a grooved roller thereon, said parts being combined substantially as described.

2. A bicycle jack having a frame with cross pieces extending on opposite sides of a longitudinally-extending piece thereof, standards on said frame, one having a deflected upper end provided with a grooved roller, and the other standards having sockets on their upper ends with recessed sides, said parts being combined substantially as described.

3. A bicycle jack having a frame consisting of the longitudinally-extending piece F, the cross pieces E extending on opposite sides of said piece F, and the extension C', the front standard B on one of said cross pieces, and having an upper deflected end with a roller thereon, and the rear standards D with upper recessed ends, said parts being combined substantially as described.

4. In a jack for a bicycle, &c., the frame thereof having chains or cords which are attachable to the steering wheel of the bicycle, and provided with means for rendering the same elastic, substantially as described.

5. The frame of a bicycle jack having chains or cords connected at one end with the base thereof, and elastic rings connected with the other ends thereof, substantially as described.

6. The frame of a bicycle jack having chains or cords connected therewith, and hooks on which the upper ends of said chains or cords are attachable, substantially as described.

WILLIAM H. HART, JR.

Witnesses:
JOHN A. WIEDERSHEIM,
R. H. GRAESER.